United States Patent
Ding et al.

(10) Patent No.: US 6,509,416 B2
(45) Date of Patent: *Jan. 21, 2003

(54) ENGINEERED POLYOLEFIN MATERIALS WITH ENHANCED SURFACE DURABILITY AND METHODS OF MAKING SAME

(75) Inventors: Ruidong Ding, Arlington, TX (US); Satchit Srinivasan, Carrollton, TX (US); Edmund K. Lau, Arlington, TX (US)

(73) Assignee: Solvay Engineered Polymers, Grand Prairie, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/074,950

(22) Filed: Feb. 12, 2002

(65) Prior Publication Data

US 2002/0107329 A1 Aug. 8, 2002

Related U.S. Application Data

(63) Continuation-in-part of application No. 09/672,063, filed on Sep. 29, 2000, now Pat. No. 6,403,721.

(51) Int. Cl.[7] .......................... C08L 9/00; C08L 23/00; C08L 33/02; C08L 43/00; C08L 45/00
(52) U.S. Cl. ................ 525/191; 525/201; 525/216; 525/232; 525/240; 525/241; 524/425; 524/441; 524/442; 524/443; 524/445; 524/449; 524/451; 524/492
(58) Field of Search ................ 525/191, 201, 525/216, 232, 240, 241; 524/425, 441, 442, 443, 445, 449, 451, 492

(56) References Cited

U.S. PATENT DOCUMENTS

| | | | |
|---|---|---|---|
| 3,236,917 A | 2/1966 | Natta et al. | |
| 3,264,272 A | 8/1966 | Rees | |
| 4,000,216 A | 12/1976 | Lang | |
| 4,393,009 A | 7/1983 | Freitag et al. | |
| 4,480,065 A | 10/1984 | Kawai et al. | 524/418 |
| 4,567,219 A | * 1/1986 | Tominaga et al. | 260/998.14 |
| 4,888,391 A | 12/1989 | Domine et al. | 525/221 |
| 4,945,005 A | 7/1990 | Aleckner et al. | 428/500 |
| 4,946,896 A | 8/1990 | Mitsumo et al. | 525/93 |
| 4,950,541 A | 8/1990 | Tabor et al. | 428/373 |
| 5,194,509 A | 3/1993 | Hasenbein et al. | 525/285 |
| 5,548,029 A | 8/1996 | Powers et al. | 525/195 |
| 5,883,188 A | 3/1999 | Hwang et al. | 525/71 |
| 5,971,869 A | 10/1999 | Rajagopalan et al. | 473/371 |
| 6,207,761 B1 | * 3/2001 | Smith et al. | 525/15 |
| 6,403,721 B1 | * 6/2002 | Ding et al. | 525/191 |

FOREIGN PATENT DOCUMENTS

| | | |
|---|---|---|
| EP | 0 794 225 A1 | 10/1997 |
| JP | 10219040 | 10/1998 |
| WO | WO 93/25617 | 12/1993 |
| WO | WO 97/38050 | 10/1997 |

* cited by examiner

Primary Examiner—Nathan M. Nutter
(74) Attorney, Agent, or Firm—Winston & Strawn

(57) ABSTRACT

A polyolefin blend including a propylene-based polyolefin-metal salt that is a reaction product of a propylene-containing polymer and a first organic monomer including a hydrophilic moiety that is at least partially neutralized with a metal ion, and an ethylene-based polyolefin-metal salt that is a reaction product of an ethylene-containing polymer and a second organic monomer including a hydrophilic moiety that is at least partially neutralized with a metal ion. Optionally, the blend includes a copolymer of ethylene and an alpha-olefin, and optionally one or more diene(s); a thermoplastic elastomer, such as an olefinic copolymer with styrene; a copolymer of ethylene, at least one alpha-olefin, and/or a monomer with a hydrophilic moiety. Also included are methods of preparing such blends, as well as the resultant articles.

21 Claims, 1 Drawing Sheet

Scratch Rating Scale

| 1 No Visible Scratch | 2 Slight Deformation | 3 Slight Ribbing | 4 Continuous Ribbing | 5 Continuous Tearing |
|---|---|---|---|---|

ENGINEERED POLYOLEFIN MATERIALS WITH ENHANCED SURFACE DURABILITY AND METHODS OF MAKING SAME

CROSS-REFERENCE TO RELATED APPLICATION

This application is a continuation-in-part of application Ser. No. 09/672,063, filed Sep. 29, 2000, now U.S. Pat. No. 6,403,721, the entire disclosure of which is hereby incorporated herein by express reference thereto.

FIELD OF THE INVENTION

The invention relates to polyolefin blends having superior physical properties including enhanced scratch resistance, rigidity, and toughness. The invention also relates to the process of manufacturing such polyolefin blends and to articles produced from such polyolefin blends.

BACKGROUND ART

In numerous applications, such as many in the automotive industry, a polymeric material that exhibits a good level of scratch resistance balanced with rigidity and impact toughness is desired. These properties tend to vary, however, such that efforts to enhance one will often result in deterioration of one, or both, of the others.

Polypropylene blends are useful in a wide variety of applications due to their strength, environmental resistance and processability. While highly crystalline polypropylene does exhibit good mar and scratch resistance, it does not possess the impact toughness required in many important applications such as the making of automobile parts. Special polymeric materials have been developed that can partially overcome this problem.

Attempts to remedy polypropylene's deficiency in impact toughness by blending with impact modifying copolymers of ethylene and other alpha-olefins, terpolymers of ethylene, other alpha-olefins, and dienes have not been completely successful. Elastomer modified polypropylene blends, also known as thermoplastic polyolefins, have the advantage of improved toughness, especially for cold temperature impact. They are widely used for formed or shaped articles such as automotive parts, toys, furniture, and housing products. Although the impact toughness of those compositions is improved by these modifiers, the scratch resistance has been found to decrease. That is, the scratch resistance of polypropylene blends including impact modifiers such as ethylene-propylene copolymers, ethylene-propylene terpolymers, ethylene-butene copolymers, or ethylene-octene copolymers is poor.

Increasing the crystallinity of the polypropylene to obtain a harder surface, and/or adding hard mineral filler to these blends, has been attempted as a countermeasure without complete success. One conventional method to enhance surface characteristics is to use inorganic particulate material. Uniform dispersion of these particulates is difficult to achieve, however, and this results in non-uniform surface properties in such products. The use of these particulates also tends to damage other desirable physical properties of the polyolefin, resulting in loss of impact strength and/or toughness. Debonding of these particulates from the polyolefin system also contributes to undesirable stress whitening.

Another conventional way to enhance surface characteristics of various articles is to apply acrylic polymers or coatings to an article and subsequently cure the polymer or coating with a radiation source, such as ultraviolet radiation.

A method to enhance surface characteristics of polyolefins is described in U.S. Pat. No. 4,000,216, which discloses an extrudable, moldable, or heat formable blend of a thermoplastic polymer and a surface altering agent of at least one monoethylenically unsaturated monomer for said thermoplastic polymer, wherein the surface altering agent has cross-linked polymer particles having an average size of 1 to 30 microns. The surface altering agent is preferably prepared by an endopolymerization, which is used with a compatible polyolefin to be altered.

European Patent Application 0794225A1 describes thermoplastic resin compositions comprising polypropylene, a styrene containing elastomer, and talc, and having an acceptable balance of toughness and rigidity. The disclosure stresses the importance of the proportions of each component used to achieve this balance. In PCT Application WO97/38050, a similar balance of properties is reported for a thermoplastic resin comprising an ethylene-propylene based polymer composition, an ethylene/alpha-olefin copolymer based rubber and/or a rubber containing vinyl aromatic compounds and talc. Another example of a composition that provides an acceptable balance of toughness and rigidity is reported in Japanese Patent Application 10219040A for a resin composition consisting of a polyolefin based resin and a block copolymer based on aromatic vinyl and butadiene monomer units. Polymer blends which can be formed or shaped into lightweight and durable articles useful, for example, as automobile parts, toys, housings for various types of equipment, and the like, are well known in the art.

The physical and/or chemical properties of the thermoplastic polyolefin blends can be modified either by blending them with other thermoplastic polymers, or by incorporating into them materials having one or more polar groups, or both. For example, U.S. Pat. No. 4,946,896 describes a thermoplastic polyolefin comprising 20–80 weight percent polypropylene; 5–38 weight percent of an ethylene copolymer consisting of ethylene, an ester unit of either alkyl acrylate or methacrylate, and an unsaturated dicarboxylic acid anhydride; and 5–70 weight percent ethylene-propylene rubber. Similarly, U.S. Pat. No. 4,888,391 describes a polyolefin composition comprising a blend of a polyolefin as the continuous phase with an ethylene/acrylate/acrylic acid terpolymer as a discontinuous phase. These polyolefin-based blends are paintable.

Despite these prior art formulations, there remains a need to obtain polymeric materials that have a good level of mar/scratch resistance along with the physical property requirements of rigidity, strength, processability, and low temperature impact toughness required for various applications. The present invention provides certain blends that meet these needs.

SUMMARY OF THE INVENTION

The present invention encompasses a polyolefin blend including from about 1 to 99 weight percent of a propylene-based polyolefin-metal salt that is a reaction product of a propylene-containing polymer functionalized with a first hydrophilic moiety and at least one metal ion present in an amount sufficient to at least partially neutralize the first hydrophilic moiety, and from about 1 to 99 weight percent of an ethylene-based polyolefin-metal salt that is a reaction product of a copolymer of ethylene functionalized with a second hydrophilic moiety and at least one metal ion present in an amount sufficient to at least partially neutralize the second hydrophilic moiety.

In one preferred embodiment, the propylene-based polyolefin-metal salt can include from about 25 weight percent to 80 weight percent of the blend and the ethylene-based polyolefin-metal salt comprises from about 5 weight percent to 60 weight percent of the blend. In another preferred embodiment, the propylene-based polyolefin-metal salt includes from about 30 weight percent to 65 weight percent of the blend and the ethylene-based polyolefin-metal salt comprises from about 20 weight percent to 55 weight percent of the blend and wherein the blend optionally further includes from about 5 to 50 weight percent of at least one of a propylene-containing homopolymer or copolymer.

In one embodiment, the first and second hydrophilic moieties each include an ethylenically unsaturated carboxylic acid monomer. Preferably, the first and second hydrophilic moieties can each independently include methacrylic acid, acrylic acid, maleic anhydride, or a mixture thereof.

In one embodiment, the polyolefin blend further includes a semi-crystalline propylene-containing polymer in an amount of up to 50 weight percent. In a preferred embodiment, the semi-crystalline propylene-containing polymer is present in an amount of about 5 to about 45 weight percent. In yet another embodiment, the polyolefin blend further includes a semi-crystalline propylene-containing polymer in an amount of greater than 50 to about 80 weight percent.

The polyolefin blend can further include about 1 weight percent to 20 weight percent of a copolymer of ethylene and an alpha-olefin, at least one of which is functionalized with a third hydrophilic moiety. In one preferred embodiment, the alpha-olefin includes at least one of propylene, 1-butene, 1-hexene, 4-methyl-1-pentene, 1-heptene, 1-octene, and mixtures thereof, and the copolymer is at least partially neutralized with at least one metal ion. In another embodiment, the polyolefin blend further includes a toughening component in an amount of up to about 40 weight percent, the toughening component comprising semi-crystalline or random copolymers of ethylene and an alpha-olefin, and optionally at least one diene. In a preferred embodiment, the diene is nonconjugated and includes at least one of straight chain dienes; cyclic dienes; or bridged cyclic dienes. In a more preferred embodiment, either the straight chain diene is present and includes 1,4-hexadiene, the cyclic diene is present and includes at least one of cyclooctadiene or dicyclopentadiene, or the bridged cyclic diene is present and includes ethylidene norbornene, or a combination thereof.

The polyolefin blend can further include an interfacial modifier of a styrenic block copolymer, a random styrenic copolymer, or mixtures thereof, present in an amount of about 0.1 to 40 weight percent of the polyolefin blend. In one embodiment, the styrenic block copolymer includes styrene-butadiene, styrene-butadiene-styrene, styrene-butene-butadiene-styrene, styrene-isoprene, styrene-isoprene-styrene, alpha-methylstyrene-butadiene-alpha-methylstyrene, alpha-methylstyrene-isoprene-alpha-methylstyrene, styrene-(ethylene-butene)-styrene, styrene-(ethylene-propylene)-styrene, styrene-(ethylene-butene), styrene-(ethylene-propylene), styrene-butene-styrene, styrene-butene, hydrogenated variations thereof, or combinations thereof. In another embodiment, the random styrenic copolymer of ethylene and styrene has a blocky comonomer distribution.

The polyolefin blend can also include a mineral filler, which is typically present in an amount from about 1 to 40 weight percent of the polyolefin blend. In another embodiment, the filler is present in an amount of about 1 to 25 weight percent. In one embodiment, the mineral filler can include at least one of talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, glass fiber, carbon fiber, clay, or mixtures thereof.

The metal ion(s) included in the polyolefin blend include at least one of lithium, sodium, potassium, magnesium, calcium, barium, lead, tin, zinc, aluminum, or mixtures thereof.

The invention also encompasses articles including the polyolefin blends above, as well as methods of preparing such articles. One such method of preparing an article according to the invention is by melt blending a propylene-based polyolefin-metal salt that is a reaction product of a propylene-containing polymer functionalized with a first hydrophilic moiety and at least one metal ion present in an amount sufficient to at least partially neutralize the first hydrophilic moiety, and an ethylene-based polyolefin-metal salt that is a reaction product of an ethylene copolymer functionalized with a second hydrophilic moiety and at least one metal ion present in an amount sufficient to at least partially neutralize the second hydrophilic moiety, so as to form a blend, wherein the melt blending is at a sufficiently high temperature so that each polymer is at least partially melted, and molding the blend into an article having an external surface, wherein the surface of the article when subjected to a 20 Newton load has less than about a 2.5 on the scratch rating scale and has no ribbing or tearing.

The method of providing propylene-based polyolefin-metal salts may include the steps of contacting a propylene-containing polymer and an organic monomer including a hydrophilic moiety under conditions such that propylene polymers are functionalized with the hydrophilic moiety, which is then neutralized with metal ions to form a reaction product. Similarly, the method of providing ethylene-based polyolefin-metal salts may include the steps of contacting a ethylene-containing polymer and an organic monomer including a hydrophilic moiety under conditions such that ethylene polymers are functionalized with the hydrophilic moiety, which is then neutralized with metal ions to form a reaction product. The reactive blending may be done in an extruder. The step of neutralizing the reaction product with metal ions may be done approximately simultaneously with the step of blending the components in a twin screw extruder. The process of contacting a propylene-containing polymer and contacting a ethylene-containing polymer with an organic monomer including a hydrophilic moiety under conditions such that propylene and ethylene polymers are functionalized with the hydrophilic moiety may be performed in a single reaction mass.

BRIEF DESCRIPTION OF DRAWING

Further features and advantages of the invention can be ascertained from the following detailed description that is provided in connection with the drawing(s) described below.

DETAILED DESCRIPTION OF THE PREFERRED EMBODIMENTS

Figure 1:
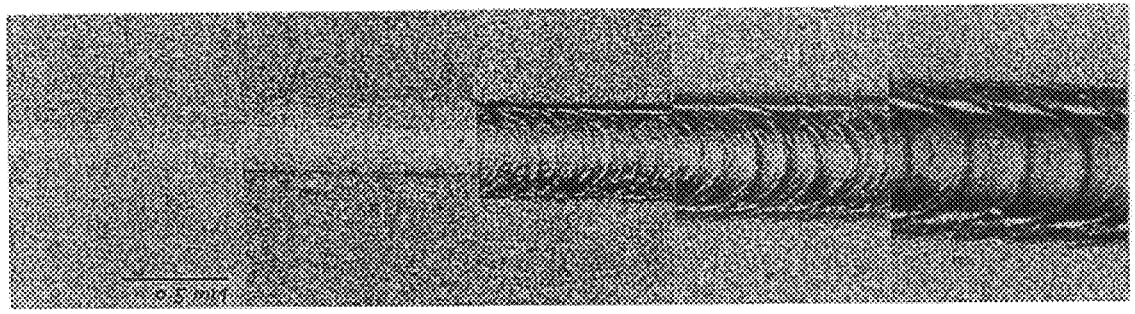
FIG. 1 is a visual representation of the Scratch Rating Scale.

As used herein, unless otherwise stated the term "percent" refers to weight percent of a polymer in the polymeric portion, that is, not including inorganic fillers and the like, of a composition or blend.

As used herein, the term "polymer" includes homopolymers, copolymers (including terpolymers), and the like. "Propylene polymer" and "ethylene polymer" can refer to a polymer including any amount of propylene units and ethylene units, respectively. In one embodiment, the term includes polymers wherein propylene is the monomer present in a concentration of at least about 50 percent.

As used herein, the term "functionalized polyolefin," for example "functionalized polypropylene," includes both ionomers, copolymers of olefins and hydrophilic moiety-containing monomers, polyolefins grafted with an organic monomer including a hydrophilic moiety, and polyolefin-metal salts.

As used herein, the term "ionomer" is meant to include a metal salt of a copolymer of ethylene and ethylenically unsaturated carboxylic acids.

As used herein, the term "polyolefin-metal salt" with a specific monomer preceding it, for example a "propylene-based polyolefin-metal salt," is a reaction product of a propylene-containing polymer and an organic monomer containing a hydrophilic moiety which is at least partially neutralized with a metal ion. Typically, a propylene-based polyolefin-metal salt is a polymer wherein the polyolefin monomer, e.g., polypropylene, is present in a polyolefin at a concentration of at least about 80 percent, preferably at least about 95 percent, before functionalizing the polyolefin, and where the polyolefin has then been functionalized with one or more hydrophilic moieties such as carboxylic acid-containing or other hydrophilic moiety-containing unsaturated monomers, i.e., maleic anhydride. This functionalized polyolefin is advantageously at least partially neutralized with a metal ion.

The term "about," as used herein, should generally be understood to refer to both numbers in a range of numerals. Moreover, all numerical ranges herein should be understood to include each whole integer within the range.

In one embodiment, the polyolefin blends include polyolefin homopolymers and/or copolymers, propylene-based polyolefin-metal salts, and ethylene-based polyolefin-metal salts. Preferably the polyolefin homopolymers and/or copolymers are polypropylene.

In another embodiment, the polyolefin blends include polypropylene homopolymers and/or copolymers, propylene-based polyolefin-metal salts, and ethylene-based polyolefin-metal salts. In yet another embodiment, the polyolefin blends include polypropylene homopolymers and/or copolymers, propylene-based polyolefin-metal salts and/or copolymers of propylene and carboxylic acid monomers, and ethylene-based polyolefin-metal salts and/or ethylene ionomers. In these embodiments, the polyolefin blend may, for example, contain greater than 50 weight percent to about 80 weight percent of propylene polymers; about 1 percent to 50 percent of propylene-based polyolefin-metal salts; and about 5 percent to 49 percent of ethylene-based polyolefin-metal salts. Preferably, the polyolefin blend contains about 53 percent to 70 percent of the propylene polymers; about 2 percent to 30 percent of the propylene-based polyolefin-metal salts; and about 15 percent to 35 percent of the ethylene-based polyolefin-metal salts. Even more preferably, the polyolefin blend contains about 57 percent to 68 percent of propylene polymers; about 5 percent to 20 percent of the propylene-based polyolefin-metal salts, and about 20 percent to 30 percent of the ethylene-based polyolefin-metal salts.

The polyolefin-metal salts may, for example, include a polyolefin backbone functionalized with at least about 0.3 percent, preferably at least 0.5 percent, of hydrophilic organic compounds based on the combined weight of the polyolefin and the hydrophilic organic compounds.

In yet another embodiment, the polyolefin blends include a propylene-containing polymer; a reaction product of an propylene-containing polymer functionalized with a hydrophilic moiety, in particular carboxylic acids, that is neutralized with a metal ion; and a reaction product of an unsaturated ethylene-containing polymer functionalized with a hydrophilic moiety, in particular carboxylic acids, that is neutralized with a metal ion.

In yet another embodiment, the polyolefin blends include a reaction product of an propylene-containing polymer functionalized with a hydrophilic moiety, in particular carboxylic acids or anhydrides, or both, that is at least partially neutralized with a metal ion; and a reaction product of an unsaturated ethylene-containing polymer functionalized with a hydrophilic moiety, in particular carboxylic acids or anhydrides, or both, that is at least partially neutralized with a metal ion.

In each of the above embodiments, there can be advantageously included one or more copolymers of styrene and one or more olefins; polypropylene homo- or copolymers; a reaction product of unsaturated copolymers of ethylene and at least one alpha-olefin that has been functionalized with a hydrophilic moiety, and neutralized with a metal salt; copolymers of ethylene and an alpha-olefin, optionally including at least one diene; and a thermoplastic elastomer, such as a styrenic block copolymer.

In one preferred embodiment, the polyolefin blends can include ethylene-based ionomers and/or ethylene-based polyolefin-metal salts, propylene-containing polymer functionalized with a hydrophilic moiety, in particular carboxylic acids, that is at least partially neutralized with a metal ion and/or propylene-based polyolefin-metal salts, and copolymers of styrene and olefins.

The polyolefin blends of the present invention have excellent scratch resistance, high rigidity, and toughness. These blends may also be advantageously paintable.

The following discussion concerns primarily propylene and ethylene based polymers, but one of ordinary skill in the art will readily see the applicability to analogous polyolefin systems that are also included within the scope of the present invention.

The first component can include a propylene-containing polymer, preferably a homopolymer of propylene. This component may also include a copolymer of propylene and at least one other olefin, for example, ethylene; 1-butene; 1-pentene; 1-hexene; 2-methyl-1-propene; 3-methyl-1-pentene; 4-methyl-1-pentene; 3,3-dimethyl-1-butene; 2,4,4-trimethyl-1-pentene; 5-methyl-1-hexene; and/or 1,4-ethyl-1-hexene; or mixtures thereof. In one embodiment, it is preferred that the propylene-containing polymer be semi-crystalline homopolymer of propylene.

In one embodiment, the propylene polymer is present in an amount from about 1 to 80 weight percent. In one preferred embodiment, the polyolefin blend includes this optional first component, which is typically a homopolymer and/or a copolymer of propylene, in an amount of up to about 50 weight percent, preferably about 1 to 49 weight percent, and more preferably about 7 to 45 weight percent. In one most preferred embodiment, the propylene homo- or co-polymer is present in an amount of about 20 to 30 weight percent. In a second preferred embodiment, the polyolefin blend includes this optional first component, which is typically a homopolymer and/or a copolymer of propylene, in an amount of greater than 50 weight percent, preferably greater than about 51 weight percent to about 80 weight percent, and more preferably about 55 to 75 weight percent.

In one embodiment, two components used to form the polyolefin blend are functionalized polyolefins. Both ethylene-based and propylene-based functionalized polyolefins are advantageously incorporated into the blend. These functionalized polyolefins may include ethylene-based polyolefin-metal salts, propylene-based polyolefin-metal salts, ethylene ionomers, ethylene-containing polymers grafted with a functional group, propylene-containing polymers grafted with a functional group, and/or copolymers of propylene and carboxylic acid monomers. The polyolefin blend can include about 1 weight percent to 99 weight percent of propylene-based functionalized polyolefins, preferably about 25 weight percent to 70 weight percent of propylene-based functionalized polyolefins, and more preferably about 30 weight percent to 65 weight percent of propylene-based functionalized polyolefins. The same concentrations can apply to embodiments incorporating copolymers of propylene and carboxylic acid monomers, which can be either partially or completely substituted for propylene-based functionalized polyolefins. Additional propylene homopolymer or copolymer can, of course, be included with the two functionalized polyolefin components.

The polyolefin blend includes about 1 weight percent to 99 weight percent of ethylene-based functionalized polyolefins, preferably from about 5 weight percent to 60 weight percent of ethylene-based functionalized polyolefins, and more preferably from about 7 weight percent to 55 weight percent of ethylene-based functionalized polyolefins. The same concentrations apply to embodiments incorporating ethylene ionomers, which can be either partially or completely substituted for ethylene-based functionalized polyolefins.

It is believed that polypropylene has excellent resistance to scratches and mars due in part to its high crystallinity. Pure polypropylene, however, typically has low impact resistance. Conventionally, the addition of ethylene copolymer improves impact strength, but tends to markedly worsen scratch and mar resistance. Thermally reversible ionic cross-linking of ethylene-based polyolefin-metal salts and/or of ionomers of ethylene permits excellent entropic recovery after deformation, which provides enhanced mar and scratch resistance over blends including ethylene polymers. Ionomers of ethylene, and ethylene-based polyolefin-metal salts, have good impact properties at low temperatures by themselves. A blend of polypropylene and ionomers of ethylene or ethylene-based polyolefin-metal salts, however, tends to have poor impact strength due to the incompatibility between the two components.

It is now believed, without being bound by theory, that the compatibility of polyolefins, especially polypropylene, with ionomers of ethylene and/or ethylene-based polyolefin-metal salts, is greatly enhanced by the presence of propylene-based polyolefin-metal salts. The physical properties of the heterogeneous polymer blends are governed by the interfacial interactions between different phases. It is believed that this propylene-based polyolefin-metal salt enhances dispersion of the composition, and increases interfacial interactions leading to surprisingly superior reinforcement without negatively affecting toughness. These interactions significantly influence blend morphology, dispersion, and distribution of polymer phases. The inclusion of propylene-based polyolefin-metal salts in a polypropylene and ethylene-based polyolefin-metal salts blend significantly improves the interfacial strength of the polymer phases, due probably to ionic bonding, and yields a thermoplastic resin with an excellent balance of scratch resistance, stiffness, and impact resistance.

In one embodiment, the functionalized polyolefins are exclusively ethylene-based polyolefin-metal salts and propylene-based polyolefin-metal salts, which have been formed as reaction products when ethylene-based functionalized polyolefins and propylene-based functionalized polyolefins are at least partially neutralized with a metal ion.

It is preferred that the propylene-based polyolefin-metal salts and ethylene-based polyolefin-metal salts be formed from semi-crystalline homopolymers of propylene and ethylene, respectively. The resulting propylene-based polyolefin-metal salts component and/or ethylene-based polyolefin-metal salts may be semi-crystalline as defined above.

The propylene-based polyolefin-metal salts of this invention preferably have a backbone of a homopolymer or one or more copolymers of propylene and up to about 20 mole percent ethylene or other alpha-olefin having up to about 12 carbon atoms. For example, the copolymer can be at least one other olefin, for example, ethylene; 1-butene; 1-pentene; 1-hexene; 2-methyl-1-propene; 3-methyl-1-pentene; 4-methyl-1-pentene; 3,3-dimethyl-1-butene; 2,4,4-trimethyl-1-pentene; 5-methyl-1-hexene; and/or 1,4-ethyl-1-hexene; or mixtures thereof. If a copolymer, this polyolefin backbone can be random, block or graft. At least a fraction of this polyolefin backbone is preferably grafted with an unsaturated organic compound including at least one site of unsaturation and at least one carbonyl or carboxyl or other hydrophilic group.

In one embodiment, the ethylene-based polyolefin-metal salts of this invention preferably have a backbone of a homopolymer or one or more copolymers of ethylene and up to about 20 mole percent propylene or other alpha-olefin having up to about 12 carbon atoms. For example, the copolymer can be at least one other olefin, for example, propylene; 1-butene; 1-pentene; 1-hexene; 2-methyl-1-propene; 3-methyl-1-pentene; 4-methyl-1-pentene; 3,3-dimethyl-1-butene; 2,4,4-trimethyl-1-pentene; 5-methyl-1-hexene; and/or 1,4-ethyl-1-hexene; or mixtures thereof. If a copolymer, this polyolefin backbone can be random, block or graft. At least a fraction of this polyolefin backbone is preferably grafted with an unsaturated organic compound including at least one site of unsaturation and at least one carbonyl or carboxyl or other hydrophilic group.

When included, these functional moieties would be added to the polyolefin backbone in an amount of at least about 0.01 percent, preferably at least about 0.1 percent, and more preferably at least about 0.5 percent, based on the combined weight of the polymer and the hydrophilic organic compound. The maximum amount of unsaturated organic compound content can vary as desired, but typically it should not exceed about 25 percent, often it should not exceed about 10 percent, and in most cases it should not exceed about 5 percent. Typical polyolefin-metal salts includes P/Y copolymers, where: P is the olefinic backbone, such as propylene and/or ethylene; and Y is the functional comonomer, such as acrylic or methacrylic acid, present in an amount of about 0.01 percent to 20 percent, preferably about 0.5 percent to 5 percent, of the polymer.

An unsaturated hydrophilic organic compound can be grafted to the base polymer by any technique known to those of ordinary skill in the art, such as those taught in U.S. Pat.

No. 3,236,917 and U.S. Pat. No. 5,194,509, both of which are incorporated herein by reference. For example, in the '917 patent, the base polymer is introduced into a two-roll mixer and mixed at a temperature of 60° C. The unsaturated organic compound is then added along with a free radical initiator, such as, for example, benzoyl peroxide, and the components are mixed at 30° C. until the grafting is completed. In the '509 patent, the procedure is similar except that the reaction temperature is higher, e.g. 210° to 300° C., and a free radical initiator is not used.

An alternative method of grafting is taught in U.S. Pat. No. 4,950,541, the disclosure of which is also incorporated herein by reference, by using a twin-screw devolatilizing extruder as the mixing apparatus. The base polymer and unsaturated organic compound are mixed and reacted within the extruder at temperatures at which the reactants are molten and in the presence of a free radical initiator. Preferably, the unsaturated organic compound is injected into a zone maintained under pressure within the extruder.

In one embodiment, the invention includes a method of preparing functionalized polyolefin-metal salts so as to form a reaction product by first functionalizing polyolefins with one or more hydrophilic monomers, for example, maleic anhydride or acrylic acid.

Any hydrophilic monomer that can be neutralized, such as unsaturated carboxylic acid monomers, can be used in the manufacture of functionalized polyolefins of this invention. Representative unsaturated organic compounds that include at least one carbonyl group include the ethylenically unsaturated carboxylic acids, anhydrides, esters, and their salts, both metallic and nonmetallic. Preferably, the organic compound includes ethylenic unsaturation conjugated with the carbonyl group. Representative compounds include maleic, fumaric, acrylic, methacrylic, itaconic, crotonic, alpha-methyl crotonic, cinnamic, and the like, acids and their anhydride, ester and salt derivatives, if any.

Combinations of functionalizing compounds can be used, such as methacrylate-vinyl acetate mixtures or acrylic acid/methacrylic acid mixtures.

Preferably, maleic anhydride, acrylic acid, methacrylic acid, or combinations thereof are used.

The functionalized polyolefin is then advantageously neutralized with at least one metal ion, typically an alkali or alkaline-earth containing compound, typically a salt or a base, to form the functionalized polyolefin-metal salts. Preferably, the acid moiety (or moieties) on each of the ionomers and functionalized polyolefin-metal salts in a blend of this invention is (are) neutralized about 30 to 100 percent, preferably at least about 40 percent, more preferably at least about 60 percent. The acid moiety is preferably neutralized with an alkali or an alkaline earth metal, but other cations or blends thereof can be used. Examples of suitable cations include lithium, sodium, potassium, magnesium, calcium, barium, lead, tin, zinc, aluminum, or a combination of such cations. The preferred cations are zinc, lithium, sodium, calcium, and magnesium. These cations are preferably added as bases to increase the degree of neutralization of acid moieties. Examples of metal-ion containing compounds include sodium carbonate, zinc acetate dihydrate, zinc oxide, zinc hydroxide, calcium oxide, calcium hydroxide, magnesium oxide, magnesium hydroxide, zinc stearate, and calcium stearate. The metal-ion containing compounds include at least about 0.01 parts per hundred (pph) and no more than 50 pph of the compound of the present invention.

In an embodiment, the polyolefin blend includes copolymers of propylene and carboxylic acid monomers substituted for some or all of the propylene-based polyolefin-metal salts. In another embodiment, the polyolefin blend includes ethylene ionomers substituted for some or all of the ethylene-based polyolefin-metal salts. In another embodiment, the polyolefin blend includes ethylene-containing polymers grafted with a functional group substituted for some or all of the ethylene-based polyolefin-metal salts. In yet another embodiment, the polyolefin blend includes the first base component, e.g., polypropylene and the second and third components that are polyolefin-metal salts of both ethylene and propylene.

The polyolefinic ionomer includes P/X/Y copolymers, where: P is the olefinic comonomer, such as propylene and/or ethylene; X is a softening comonomer, such as acrylate or methacrylate present in an amount of up to about 10 percent, preferably up to about 2 percent of the polymer; and Y is the functional comonomer, such as acrylic or methacrylic acid, present in an amount of about 0.01 percent to 20 percent, preferably about 0.5 percent to 5 percent, of the polymer.

Ionomer resins, for example those sold under the trademark SURLYN™ by E.I. DuPont de Nemours and Co. of Wilmington, Del., are suitable for use in the blends. These ionomer resins are a copolymer of an olefin and an alpha, beta-ethylenically unsaturated carboxylic acid with 10 to 90 percent of the carboxylic acid groups neutralized by a metal ion. See, e.g., U.S. Pat. No. 3,264,272. Commercially available ionomer resins typically include copolymers of ethylene and methacrylic or acrylic acid. These ionomer resins are generally distinguished by the type of metal ion, the amount of acid, and the degree of neutralization.

Suitable ethylene ionomers include, but are not limited to, ethylene/acrylic acid ionomers, ethylene/methacrylic acid ionomers, ethylene/acrylic acid/n-butyl acrylate ionomers, ethylene/methacrylic acid/iso-butyl acrylate ionomers, ethylene/acrylic acid/iso-butyl acrylate ionomers, ethylene/methacrylic acid/n-butyl methacrylate ionomers, ethylene/acrylic acid/methyl methacrylate ionomers, ethylene/acrylic acid/methyl acrylate ionomers, ethylene/methacrylic acid/methyl acrylate ionomers, ethylene/methacrylic acid/methyl methacrylate ionomers, ethylene/acrylic acid/n-butyl methacrylate ionomers, and combinations thereof.

The manner in which the ionomers are made is known in the art. The ionomer can be made by adding organic monomer including a hydrophilic moiety, also called an ionic monomer, to the composition during the manufacture of the blends of the polyolefinic polymer.

Suitable ethylene-containing polymers grafted with a functional group include, but are not limited to, ethylene/acrylic acid, ethylene/methacrylic acid, ethylene/acrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/ methyl acrylate, ethylene/methacrylic acid/methyl acrylate, ethylene/methacrylic acid/methyl methacrylate, ethylene/acrylic acid/n-butyl methacrylate. Such ethylene-containing polymers grafted with a functional group are commercially available, for example those sold under the trademark Nucrelm™ by E.I. DuPont de Nemours and Co. of Wilmington, Del.

Acrylic acid, methacrylic acid, maleic anhydride, itaconic acid, and the like may under some circumstances be added to the ethylene and/or propylene monomers during the polymerization of the polyethylene and/or copolymers of propylene and carboxylic acid monomers, respectively.

The method of manufacturing a polyolefin blend includes providing propylene-containing polymer; providing ionomers and/or ethylene-based polyolefin-metal salts; providing any optional polymeric components, and blending the components to make a homogenous blend.

One method of manufacturing propylene-based polyolefin-metal salts includes the steps of contacting a propylene-containing polymer and an organic monomer including a hydrophilic moiety under conditions such that the propylene polymers are functionalized with the hydrophilic moiety, and neutralizing the reaction product with metal ions.

One method of manufacturing ethylene-based polyolefin-metal salts includes the steps of contacting a ethylene-containing polymer and an organic monomer including a hydrophilic moiety under conditions such that the ethylene polymers are functionalized with the hydrophilic moiety, and neutralizing the reaction product with metal ions. The step of neutralizing the functionalized olefins with metal ions can be accomplished approximately at the same time as the blending with the polyolefins. In one embodiment, an already functionalized propylene-containing polymer can be added as a separate component.

The manufacture of propylene-based polyolefin-metal salts and ethylene-based polyolefin-metal salt can be performed in a single reaction mass. It is conceivable that such reactions may also be performed in a one-step process using functional oligomeric salts.

An optional component present in an embodiment of the polyolefin blend is a copolymer or functionalized polyolefins of ethylene, high alpha-olefin copolymers, and monomers with a hydrophilic moiety. High alpha-olefins include, for example, an alpha-olefin of 4 to about 20 carbon atoms (e.g. 1-butene, 1-hexene, 4-methyl-1-pentene, 1-heptene, 1-octene, styrene, etc.), preferably of 4 to 10 carbon atoms, and most typically these polymers include ethylene and one or more of 1-butene, 1-hexene, or 1-octene. Again, the hydrophilic component can be added in types and in concentration ranges like those described for other ionomers.

The concentration of these ionomers or functionalized polyolefins of ethylene and high alpha-olefin copolymers, when included, can be from about 1 percent to 20 percent, preferably from about 5 percent to 15 percent, of the polyolefin blend. These ionomers, when used, are added to the blend of the components discussed above.

Another optional component present in a preferred embodiment of the polyolefin blend of the present invention is an interfacial modifier. This is preferably a thermoplastic elastomer including a styrenic block copolymer. The term "styrene block copolymer" or "styrenic block copolymer" means an elastomer having at least one block segment of a styrene repeating unit in combination with saturated or unsaturated rubber monomer segments. This component, when included, contributes to the compatibilization of the components in the blend, and also significantly improves adhesion between the polymeric phases. This typically increases the toughness of the overall blend while maintaining rigidity. This component is therefore an optional toughener.

Acceptable styrenic block copolymers include, but are not limited to, copolymers of styrene, ethylene and another alkene. Exemplary copolymers include styrene-(ethylene-butene)-styrene, styrene-(ethylene-propylene)-styrene, styrene-(ethylene-butene), styrene-(ethylene-propylene), styrene-butene-styrene, styrene-butene, styrene-butadiene, styrene-isoprene, and hydrogenated variations thereof. Suitable styrene block copolymers also include styrene-butadiene-styrene, styrene-butene-butadiene-styrene, styrene-isoprene-styrene, alpha-methylstyrene- butadiene-alpha-methylstyrene, alpha-methylstyrene-isoprene-alpha-methylstyrene, and the like. The structure of the styrene block copolymers useful in the present invention can be of the linear or radial type, and of the di-block or tri-block type. In some embodiments the styrenic block copolymers having at least four different blocks or a pair of two repeating blocks, for example, repeating styrene/butadiene or styrene/ethylene propylene blocks, are desirable.

Styrene block copolymers are available from Shell Chemical of Houston, Tex. under the trademark KRATON, and from Phillips Petroleum Co., Inc. of Bartlesville, Okla. under the trademark K-RESIN.

The rubber portion of the styrene block copolymer may be either unsaturated or saturated. Block copolymers with unsaturated rubber monomer units may include homopolymers of butadiene or isoprene and copolymers of one or both of these two dienes with a minor amount of styrenic monomer. When such a block is hydrogenated, the resulting product is, or resembles, a regular copolymer block of ethylene and 1-butene. If the conjugated diene employed is isoprene, the resulting hydrogenated product is or resembles a regular copolymer block of ethylene and propylene. Hydrogenation of block copolymers with unsaturated rubber monomer units may be effected by use of a catalyst.

The styrenic block copolymer component, when used, can make up from about 0.1 to 40 percent, more preferably from about 1 to 20 percent, and even more preferably about 5 to 15 percent of the overall polyolefin blend. Of course, quantities less than 0.1 percent can be used but will have little effect on the properties of the blend.

A random styrenic copolymer of ethylene and styrene may be used in place of or in addition to the styrenic block copolymer. It is preferred that the random styrenic copolymer of ethylene and styrene have a blocky comonomer distribution. By blocky comonomer distribution it is meant that there are more repeating monomer units than would be expected in a random distribution. Such a distribution would be provided by a random distribution of blocks of a plurality of monomer units. This type of polymer can be manufactured by single-site catalysis, i.e., metallocene or single-site non-metallocene catalysis. The random styrenic copolymer including ethylene and styrene is present in an amount from about 0.1 to 40 percent, more preferably from about 1 to 20 percent, and even more preferably about 5 to 15 percent of the overall polyolefin blend.

Another optional component present in a preferred embodiment of the polyolefin blend of the present invention is a toughening component of semi-crystalline or random copolymers of ethylene and an alpha-olefin, optionally including at least one nonconjugated diene.

The random noncrystalline copolymer of ethylene and alpha-mono-olefins, such as propylene, are rubbery toughening agents. The toughening component useful in the practice of the invention will typically include from about 30 to 90 weight percent, preferably from about 40 to 80 weight percent, and more preferably from about 50 to 70 weight percent of a first olefin monomer (preferably ethylene) and from about 10 to 70 weight percent, preferably from about 20 to 60 weight percent, and more preferably from about 30 to 50 weight percent of a second alpha-olefin (preferably 1-hexene or 1-octene).

The random copolymer also includes a terpolymer of noncrystalline rubbery copolymer of two or more olefins, such as ethylene and propylene, and a lesser quantity of at least one nonconjugated diene. Although any suitable non-conjugated dienes can be used, the dienes are preferably straight chain dienes; cyclic dienes; bridged cyclic dienes; or a combination thereof. Preferred straight chain dienes include 1,4-hexadiene. Preferred cyclic dienes include cyclooctadiene or dicyclopentadiene. Preferred bridged cyclic dienes include ethylidene norbornene. When dienes are used, any $C_4$ to $C_{18}$ alkene can be used. A preferred diene for use in such terpolymers is ethylidene norbornene.

The copolymer toughening component, particularly when at least one diene is present, useful in the practice of the invention will typically include from about 30 to 90 weight percent, preferably from about 40 to 80 weight percent, and more preferably from about 50 to 70 weight percent of a first olefin monomer (i.e., ethylene); typically from about 10 to 70 weight percent, preferably from about 20 to 60 weight percent, and more preferably from about 30 to 50 weight percent of a second alpha-olefin, and typically from about 0.5 to 20 weight percent, preferably from about 1 to 12 weight percent, and more preferably from about 3 to 8 weight percent of non-conjugated diene. When the copolymer includes at least one diene, the amount present is not typically critical and values as low as about 0.5 percent of diene can be useful.

Compounds suitable as toughening components are commercially available from Exxon Chemical Americas of Houston, Tex., as VISTALON 404, 2727, 808 or 878, from Uniroyal Chemical, Division of Crompton Corporation of Middlebury, Conn., as ROYALENE 521, 552 or 580, and from Dupont Dow Elastomers LLC of Wilmington, Del., as NORDEL 4640, 2744 or 3730P. The toughening component includes (A) a copolymer of ethylene and another alpha-olefin or (B) a copolymer of ethylene, another alpha-olefin, and a diene. This toughening component adds toughening properties to the composition and improves the impact resistance of the blends.

Suitable alpha-olefins present in this optional toughening component can include any $C_3$ to $C_{18}$ olefin, preferably a $C_3$ to $C_{10}$ olefin. For example, propylene, butene or octene are useful. In some embodiments, a copolymer including ethylene and octene is preferred.

The copolymers, including terpolymers, used in the optional toughening component of the present invention can be made according to any of the various means known to the ordinary-skilled artisan in this field, such as by addition free radical polymerization, cationic or anionic polymerization, or catalyst driven polymerization, to name but a few. As the ordinary-skilled artisan in this field knows, each of these different methods can be used to produce different types of copolymers having two or more units, such as graft polymers, block polymers, random polymers, etc., as desired.

This toughening component is present in an amount of up to about 40 percent of the overall composition, preferably from about 1 to 25 percent, and even more preferably from about 8 to 20 percent.

The polyolefin blends preferably include: a reaction product of a propylene-containing polymer functionalized with a hydrophilic moiety, in particular carboxylic acids, that is at least partially neutralized with a metal ion; an ethylene-based ionomer and/or a reaction product of an ethylene-containing polymer functionalized with a hydrophilic moiety, in particular carboxylic acids, that is at least partially neutralized with a metal ion; optionally, a semi-crystalline propylene-containing polymer; propylene and an alpha-olefin copolymer, i.e., an ethylene-propylene copolymer; optionally, an ionomer of ethylene and high alpha-olefin monomers or a functionalized polyolefin that is a reaction product of ethylene/high alpha-olefin polymers functionalized with a hydrophilic moiety, in particular carboxylic acids, and neutralized with a metal; optionally, a toughening component including semi-crystalline copolymers of ethylene and alpha-olefin, optionally including at least one diene; and optionally, an interfacial modifier or toughener, for example a thermoplastic elastomer, such as a styrenic block copolymer.

The polyolefin blends can include other property-modifying ingredients to the extent that the presence of such additives does not interfere with the performance of the compositions, e.g., the scratch and mar resistance and, in some cases, the paintability. For instance, examples of optional modifying ingredients include processing aids, such as calcium stearate; primary antioxidants, such as IRGANOX 1010 or 1076 phenolic antioxidants (available from Ciba Specialty Chemicals of Tarrytown, N.Y.), secondary antioxidants such as IRGANOX 168 phosphite (available from Ciba) or SANDOSTAB PEPQ phosphonite (available from Clariant Corporation of Charlotte, N.C.) or Ultranox phosphite (available from General Electric Specialty Chemicals of Parkersburg, W.Va.); ultraviolet light stabilizers, such as carbon black; hindered amine light stabilizers such as Tinuvin and Chimassorb brands (available from Ciba Specialty Chemicals of Tarrytown, N.Y.); and ultraviolet light absorbers such as benzotriazole-based Tinuvin brands (available from Ciba Specialty Chemicals of Tarrytown, N.Y.); and benzophenone-based Cyasorb brands (available from Cytec Industries of Stamford, Conn.).

Another class of modifying ingredients are color concentrates, which may optionally be included at concentrations of up to about 10 percent, typically from about 1 to 5 percent.

Another example of a class of modifying ingredients are mineral fillers. The mineral fillers can be a treated or untreated inorganic material, such as talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, glass fiber, carbon fiber and/or clay. The mineral filler can optionally be present in an amount of up to about 40 percent of the overall composition, and typically from about 5 to 25 percent.

Each optional ingredient can be admixed with the blend, or admixed with the ingredients during manufacture of the blend. The present invention includes a method of manufacture of the above blends by, for example, extrusion. The polyolefin blends of this invention are mixed by any conventional manner that insures the creation of a relatively homogeneous blend.

The functionalized polyolefin-metal salts may be formed continuously and simultaneously via melt blending of the components of the present invention (i.e., the propylene-containing polymer functionalized with a hydrophilic moiety, the ethylene-containing polymer functionalized with a hydrophilic moiety, and the metal-ion containing component(s)). Techniques for melt blending of a polymer with additives of all types are known in the art and can typically be used in the practice of this invention. Typically, in a melt blending operation useful in the practice of the present invention, the individual components of the composite are combined in a mechanical extruder or mixer, and then heated to a temperature sufficient to form a polymer melt. The mechanical mixer can be a continuous or batch mixer. Examples of suitable continuous mixers are single screw extruders, intermeshing co-rotating twin screw extruders such as Werner & Pfleiderer ZSK™ extruders, counter-rotating twin screw extruders such as those manufactured by Leistritz™, and reciprocating single screw kneaders such as Buss™ co-kneaders. Examples of suitable batch mixers are lateral 2-roll mixers such as Banbury™ or Boling™ mixers.

The polyolefin blend may be prepared by shear mixing the components of the present invention in the melt at a temperature equal to or greater than the melting point of the polyolefin. "Melting point" is defined as the first order transition temperature at which a crystalline solid changes from a solid state to a fluid state. The temperature of the melt, residence time of the melt within the mixer, and the mechanical design of the mixer are several of the variables that control the amount of shear to be applied to the composition during mixing.

In a preferred embodiment, the polyolefin blend is prepared by mixing the propylene-containing polymer functionalized with a hydrophilic moiety, the ethylene-containing polymer functionalized with a hydrophilic moiety, and the metal-ion containing component in a modular intermeshing co-rotating twin-screw extruder, such as those manufactured by Leistritz™. Other manufacturers of this type of equipment include co-rotating twin screw extruders from Berstorff™, Werner and Pfleiderer™, Japanese Steel Works, and others. The screw diameter for this type of mixer may vary from about 25 to 300 mm. Without being bound by theory, commercially viable production rates of the final polymer blend of the current invention should be achievable with screw diameters of at least about 70 mm.

A description of a suitable conventional extruder can be found in U.S. Pat. No. 4,857,600 and includes a series of sections, or modules, which perform certain mixing functions on the composition. The polyolefin blend components are fed into the initial feed section of the extruder at the main feed hopper. Other ingredients, such as fillers, thermal stabilizers, and others as described above, may also be fed into the main feed hopper of the mixing extruder as dry powders or liquids.

The components of the polyolefin blend are homogenized within an initial melting and mixing section of the extruder. The polymer melt temperature is raised by a sequence of kneading blocks to just above the highest softening point of the polymer blend. Within this first mixing section of the extruder, it is desirous to maintain the polymer temperature above the melting point of the polymer blend within the time frame of the melting process of about 5 to 20 seconds. Although any suitable melt temperature can be used depending on the melting point of the polymeric materials being blended, a melt temperature of about 160° C. to 180° C. is preferred for the first mixing section. In one preferred embodiment, the melt temperature can be about 165° C. to 175° C.

Subsequent to the first mixing section, there is a second mixing section of the extruder to perform kneading and distributive mixing to ensure sufficiently uniform distribution of the components of the polyolefin blend. The mixing temperature in this section should be from about 160° C. to 270° C., preferably from about 170° C. to 260° C. In one preferred embodiment, the mixing temperature can be from about 180° C. to 250° C.

Another section of the mixing extruder includes melt compression prior to extrusion through a die plate. The melt compression can be accomplished with the co-rotating twin screw extruder, or melt compression can be done via a de-coupled process, such as a single screw extruder or a melt gear pump. At the end of the compression section, the composition is typically discharged through a die plate.

Alternatively, the functionalized polyolefin-metal salts can be blended with polypropylene to produce the improved polyolefin blends of the present invention.

Another aspect of the present invention is a method for making an article of manufacture including the step of molding the described polyolefin blend into a desired configuration and shape of the article of manufacture.

The present invention also includes the resultant molded blends and the finished articles made therefrom. Given the good balance of toughness and rigidity in the materials of the present invention, as well as other excellent properties noted previously, the polyolefin blends of the invention are suitable for many specialized applications. For example, this material can be shaped into components used in many interior and exterior automobile parts. Shaping, as used herein, could include molding and/or extruding, with the injection molding of a blend of the recited components being preferred. Such finished articles have excellent scratch and mar resistance.

The molded articles from the compositions of these inventions exhibit high resistance to scratches and marring. In addition, such finished articles are optionally paintable. These are important properties in certain commercial applications, though it should be understood that any given blend according to the invention need not have the improved properties in all of these categories.

The fabricated articles of this invention can be prepared by any known thermoplastic fabrication methods, and particularly by known thermoplastic molding methods, such as injection, compression, blow, rotational, reaction injection and molding techniques. Also, the fabricated articles of this invention can be painted by known coating methods, including spray paint applications and in-mold coating techniques.

EXAMPLES

These and other aspects of the present invention may be more fully understood with reference to the following examples, which are merely illustrative of preferred embodiments of the present invention and are not to be construed as limiting the invention.

Examples of prior art blends are included in Controls 1–4, shown in Table 1. Representative compositions of blends of the current invention, and physical properties thereof, are found in Examples 1–5, also shown in Table 1. This data shows that polyolefin blends with a wide range of physical properties can be made using compositions of this invention. The compositions of the present invention have excellent scratch and mar resistance and good impact strength.

In order to measure surface scratch resistance, the Ford Laboratory Test Method BN 108-13 "Resistance to Scratching" was modified for the requirements of the present invention. The apparatus includes a pneumatically driven sledge with five metal fingers (250 nm long). One end of each metal finger is fixed while the other end is supplied with an interchangeable scratch pin with a tungsten carbide tip (1.0 mm in diameter). The pins are loaded with different weights to exert standard forces on the surface of the test material. The loads have been increased, as allowed in the Ford Laboratory Test Method, in order to meet the required scratch forces on the surface of the samples. The loading forces are reported in Newtons (N).

| Scratch finger No. | |
|---|---|
| 1 | 20.0 N |
| 2 | 15.0 N |
| 3 | 10.0 N |
| 4 | 5.0 N |
| 5 | 2.0 N |

The test specimens are cut or molded to 100 mm×100 mm in dimensions and conditioned at room temperature for more than 24 hours prior to testing. The test plaques are placed under the five metal fingers of the apparatus and pushed by hand from right to left at a sliding velocity of approximately 100 mm per second. All tests are performed once for each plaque at room temperature. Upon completion of the test, the specimens are then evaluated visually on a numerical scale of 1 to 5 where:

| Scratch Rating | Description |
|---|---|
| 1 | No visible scratch |
| 1.5 | Gloss change without deformation |
| 2 | Slight deformation |
| 2.5 | Moderate deformation |
| 3 | Slight ribbing in scratch |
| 3.5 | Frequent ribbing |
| 4 | Continuous ribbing |
| 4.5 | Points of tearing |
| 5 | Continuous tearing |

The evaluations for the heaviest stylus loadings (20N and 15N) are reported in the following examples. FIG. 1 is a visual representation of the Scratch Rating Scale showing a composite of five (5) views under an optical light microscope at 40× magnification. Deformation is defined as a permanent indentation on the surface of the test specimen. Ribbing is defined as crescent lines or ripples formed inside the scratch. Tearing is caused when the scratch apparatus breaks the surface of the test specimen.

Preferred polyolefin blends of this invention preferably have a scratch rating of about 2.5 or less at a 20N loading, preferably less than about 2.5, showing only moderate deformation with no ribbing or tearing; or a scratch rating of 2 or less at a 15N loading, showing only slight deformation with no ribbing or tearing.

Although preferred embodiments of the invention have been illustrated in the accompanying drawings and described in the foregoing Detailed Description of the Preferred Embodiments, it will be understood that the invention is not limited to the embodiments disclosed but is capable of numerous rearrangements and modifications of parts and elements without departing from the spirit of the invention. It will be understood that the chemical details of every design and embodiment may be slightly different or modified by one of ordinary skill in the art without departing from the blends and methods taught by the present invention.

What is claimed is:

1. A polyolefin blend comprising from about 1 to 99 weight percent of a propylene-based polyolefin-metal salt that is a reaction product of a propylene-containing polymer functionalized with a first hydrophilic moiety and at least one metal ion present in an amount sufficient to at least partially neutralize the first hydrophilic moiety, and from about 1 to 99 weight percent of an ethylene-based polyolefin-metal salt that is a reaction product of a copolymer of ethylene functionalized with a second hydrophilic moiety and at least one metal ion present in an amount sufficient to at least partially neutralize the second hydrophilic moiety.

2. The polyolefin blend of claim 1, wherein the propylene-based polyolefin-metal salt comprises from about 25 weight percent to 80 weight percent of the blend and the ethylene-based polyolefin-metal salt comprises from about 5 weight percent to 60 weight percent of the blend.

3. The polyolefin blend of claim 1, wherein the propylene-based polyolefin-metal salt comprises from about 30 weight percent to 65 weight percent of the blend and the ethylene-based polyolefin-metal salt comprises from about 20 weight percent to 55 weight percent of the blend and wherein the

TABLE 1

| Polymer of | Control 1 | Control 2 | Control 3 | Control 4 | Ex. 1 | Ex. 2 | Ex. 3 | Ex. 4 | Ex. 5 |
|---|---|---|---|---|---|---|---|---|---|
| Polypropylene, %[1] | — | 30 | 30 | 40 | — | — | 30 | 30 | 40 |
| Polypropylene-MA, %[2] | 60 | 30 | — | 20 | 60 | 60 | 30 | — | 20 |
| Polypropylene-MA, %[3] | — | — | 30 | — | — | — | — | 30 | — |
| Ethylene/Methacrylic Acid, %[4] | 40 | 40 | 40 | 40 | 40 | 40 | 40 | 40 | 30 |
| Styrenic (block), %[5] | — | — | — | — | — | — | — | — | 10 |
| Metal Ion, pph[6] | — | — | — | — | 4 | 8 | 4 | 4 | 4 |
| Anti-oxidant Irganox B-225, pph | 0.4 | 0.4 | 0.4 | 0.4 | 0.4 | 0.4 | 0.4 | 0.4 | 0.4 |
| Property | | | | | | | | | |
| MFR, 230/2.16 (dg/min)[7] | 65.2 | 45.1 | 101.6 | 37.7 | 38.9 | 26.3 | 17.6 | 38.2 | 13.1 |
| Flexural Modulus (kpsi)[8] | 149 | 157 | 152 | 148 | 159 | 170 | 154 | 160 | 133 |
| Tensile Strength (psi)[9] | 3515 | 3731 | 3715 | 3765 | 4193 | 4474 | 4290 | 4289 | 3699 |
| Izod @RT (ft-lb/in)[10] | 0.75 | 2.36 | 0.52 | 1.76 | 1.63 | 3.45 | 2.01 | 1.49 | 5.72 |
| Scratch on surface at 20 N | 3.5 | 3.5 | 3.5 | 3 | 2.5 | 2.5 | 2.5 | 2.5 | 2.5 |
| Scratch on surface at 15 N | 2.5 | 2.5 | 2.5 | 2.5 | 2 | 2 | 2 | 2 | 2 |

[1]Polypropylene homopolymer with MFR = 12 dg/min.
[2]Polypropylene functionalized with maleic anhydride (MA) with MFR = 50 dg/min.
[3]Polypropylene functionalized with maleic anhydride (MA) with MFR > 200 dg/min.
[4]Copolymer of ethylene/methacrylic acid, 15% MAA.
[5]Hydrogenated styrenic elastomer, SEBS block copolymer.
[6]Metal ion containing compound such as zinc acetate
[7]Melt flow rate measured at 230° C., under a load of 2.16 kg, according to ASTM D-1238.
[8]Measured at 23° C., according to ASTM D-790.
[9]Measured at 23° C., according to ASTM D-638.
[10]Impact resistance, measured at 23° C. in a direction perpendicular to the flow, according to ASTM D-256.

blend optionally further comprises from about 5 to 50 weight percent of at least one of a propylene-containing homopolymer or copolymer.

4. The polyolefin blend of claim 1 wherein the first and second hydrophilic moieties each comprise an ethylenically unsaturated carboxylic acid monomer.

5. The polyolefin blend of claim 4, wherein the first and second hydrophilic moieties each independently comprise methacrylic acid, acrylic acid, maleic anhydride, or a mixture thereof.

6. The polyolefin blend of claim 1, further comprising a semi-crystalline propylene-containing polymer in an amount of up to 50 weight percent.

7. The polyolefin blend of claim 6, wherein the semi-crystalline propylene-containing polymer is present in an amount of about 5 to about 45 weight percent.

8. The polyolefin blend of claim 1, further comprising a semi-crystalline propylene-containing polymer in an amount of greater than 50 to about 80 weight percent.

9. The polyolefin blend of claim 1, further comprising about 1 weight percent to 20 weight percent of a copolymer of ethylene and an alpha-olefin, at least one of which is functionalized with a third hydrophilic moiety.

10. The polyolefin blend of claim 9, wherein the alpha-olefin comprises at least one of propylene, 1-butene, 1-hexene, 4-methyl-1-pentene, 1-heptene, 1-octene, and mixtures thereof, and the copolymer is at least partially neutralized with at least one metal ion.

11. The polyolefin blend of claim 1, further comprising a toughening component in an amount of up to about 40 weight percent, the toughening component comprising semi-crystalline or random copolymers of ethylene and an alpha-olefin, and optionally at least one diene.

12. The polyolefin blend of claim 11, wherein the diene is nonconjugated and comprises at least one of straight chain dienes; cyclic dienes; or bridged cyclic dienes.

13. The polyolefin blend of claim 12, wherein either the straight chain diene is present and comprises 1,4-hexadiene, the cyclic diene is present and comprises at least one of cyclooctadiene or dicyclopentadiene, or the bridged cyclic diene is present and comprises ethylidene norbornene, or a combination thereof.

14. The polyolefin blend of claim 1, further comprising an interfacial modifier of a styrenic block copolymer, a random styrenic copolymer, or mixtures thereof, present in an amount of about 0.1 to 40 weight percent of the polyolefin blend.

15. The polyolefin blend of claim 14, wherein the styrenic block copolymer comprises styrene-butadiene, styrene-butadiene-styrene, styrene-butene-butadiene-styrene, styrene-isoprene, styrene-isoprene-styrene, alpha-methylstyrene-butadiene-alpha-methylstyrene, alpha-methylstyrene-isoprene-alpha-methylstyrene, styrene-(ethylene-butene)-styrene, styrene-(ethylene-propylene)-styrene, styrene-(ethylene-butene), styrene-(ethylene-propylene), styrene-butene-styrene, styrene-butene, hydrogenated variations thereof, or combinations thereof.

16. The polyolefin blend of claim 14, wherein the random styrenic copolymer of ethylene and styrene has a blocky comonomer distribution.

17. The polyolefin blend of claim 1, further comprising a mineral filler present in an amount from about 1 to 40 weight percent of the polyolefin blend.

18. The polyolefin blend of claim 17, wherein the mineral filler comprises at least one of talc, calcium carbonate, wollastonite, alumina trihydrate, barium sulfate, calcium sulfate, carbon blacks, metal fibers, boron fibers, ceramic fibers, polymeric fibers, kaolin, glass, ceramic, carbon or polymeric microspheres, silica, mica, glass fiber, carbon fiber, clay, or mixtures thereof, and is present in an amount from about 1 weight percent to 25 weight percent.

19. The polyolefin blend of claim 1, wherein the metal ion comprises at least one of lithium, sodium, potassium, magnesium, calcium, barium, lead, tin, zinc, aluminum, or mixtures thereof.

20. An article comprising the polyolefin blend of claim 1.

21. A method of preparing an article from a polyolefin blend which comprises:

melt blending a propylene-based polyolefin-metal salt that is a reaction product of a propylene-containing polymer functionalized with a first hydrophilic moiety and at least one metal ion present in an amount sufficient to at least partially neutralize the first hydrophilic moiety, and an ethylene-based polyolefin-metal salt that is a reaction product of an ethylene copolymer functionalized with a second hydrophilic moiety and at least one metal ion present in an amount sufficient to at least partially neutralize the second hydrophilic moiety, so as to form a blend, wherein the melt blending is at a sufficiently high temperature so that each polymer is at least partially melted; and molding the blend into an article having an external surface, wherein the surface of the article when subjected to a 20 Newton load has less than about a 2.5 on the scratch rating scale and has no ribbing or tearing.

* * * * *